United States Patent [19]
Hunt et al.

[11] 3,765,779
[45] Oct. 16, 1973

[54] CALIBRATION TECHNIQUE AND APPARATUS

[75] Inventors: Graham R. Hunt, Winchester; Lloyd M Logan, Dracut, both of Mass.

[73] Assignee: The United States of America as represented by the Secretary of the Air Force.

[22] Filed: June 27, 1972

[21] Appl. No.: 266,786

[52] U.S. Cl. ................. 356/216, 356/43, 73/355
[51] Int. Cl. .......................... G01j 5/48, G01j 1/56
[58] Field of Search ................. 356/216, 43, 44, 356/45, 46, 47, 48, 49, 50; 73/355, 1 F

[56] References Cited
UNITED STATES PATENTS
3,498,132   3/1970   Smith et al. ........................ 73/355
2,978,589   4/1961   Howell ............................... 356/48

Primary Examiner—David Schonberg
Assistant Examiner—Conrad Clark
Attorney—Harry A. Herbert, Jr. et al.

[57] ABSTRACT

A technique or method and apparatus utilizing energy available from metal mirrors having different emissivities as a calibration source for radiometers that determine absolute radiance of low energy, infrared targets near and below ambient temperatures. By the changing of a mirror in the optical train with one of different reflectivity, the relationship between reflectivity and emissivity enables the calculation of the number of photons in the field of view of a detector for each mirror such that the altering of the photon flux in a predictable manner by the change of mirrors enables calibration.

10 Claims, 1 Drawing Figure

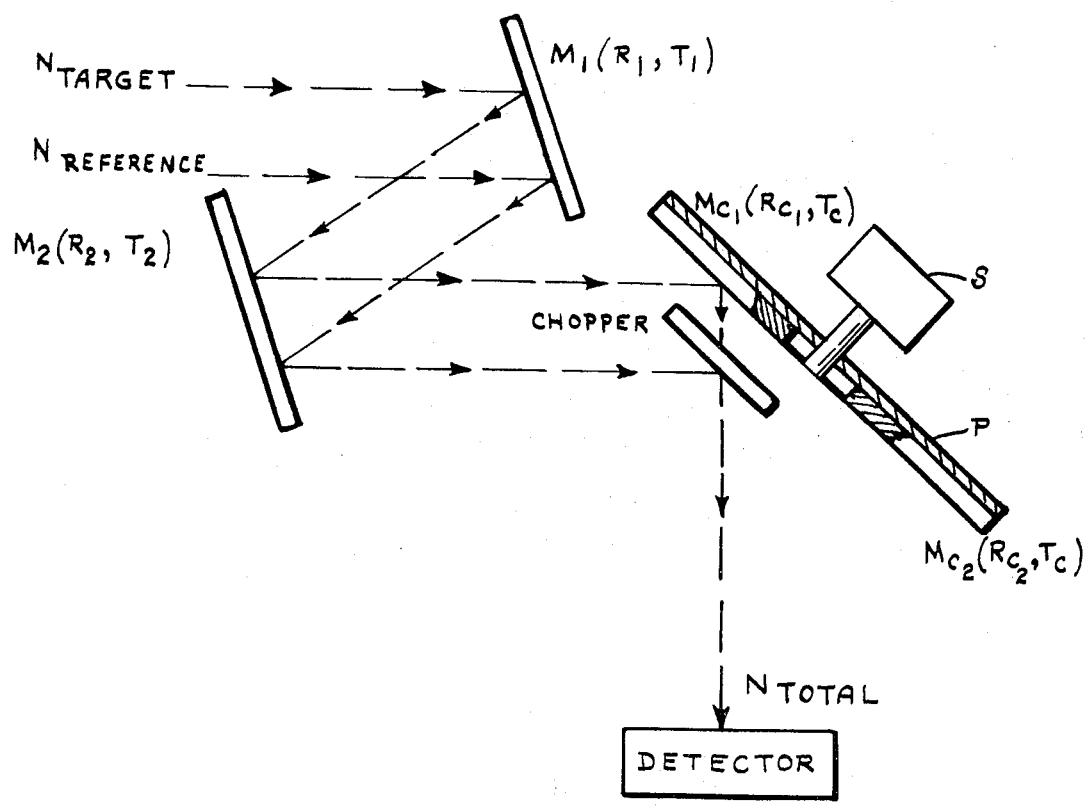

CALIBRATION TECHNIQUE AND APPARATUS

BACKGROUND OF THE INVENTION

This invention relates generally to radiometers and more particularly to a method and apparatus for calibration of radiometers used for low energy infrared targets.

Previously, controlled temperature, black body sources were utilized to calibrate radiometers; however, these devices were heavy, cumbersome and expensive. Additionally, for upper atmosphere and outer space research, the payload reduction caused by these devices and the difficulty in their remote control inhibited their effective use.

An alternate, previously suggested calibration technique involved the use of an attenuating device before the detector. Since this type of device emits and alters the detector background, it effectively destroys the accuracy of the system.

For targets near and below ambient temperature, the emitted energy from non-cooled optics caused difficulty in that it represented a significant portion of the overall signal.

SUMMARY OF THE INVENTION

The invention is a calibration technique for radiometers which measures the energy of low energy, infrared targets. The calibration is effected by alternately using, as a series of known energy sources, the emitted energy from a series of mirrors constructed of different material such that their reflectivities, and hence their emissivities, are different in the wavelength range of interest (here the mid-infrared). During the calibration process, the series of mirrors sequentially occupy the same position in the optical train of radiometer, replacing any normally included plane mirror located prior to the modulating device. The energy emitted into the radiometer field of view is precisely calculable from a knowledge of each mirror's reflectivity and temperature.

Accordingly, it is a primary object of this invention to provide a method and apparatus for calibrating radiometers operating with low energy targets in the infrared range.

It is another object of this invention to provide a technique and apparatus for calibrating radiometers by utilizing a series of mirrors of different reflectivity as known energy sources.

It is still another object of this invention to provide a calibration apparatus for radiometers utilizing a series of mirrors which have a common backing plate of a material having good thermal conductivity to equalize the temperature of all the mirrors on the plate.

It is a further object of this invention to provide a calibration apparatus utilizing a series of specular mirrors, which are optically thick at a predetermined wavelength, to eliminate diffuse components thereby avoiding energy from without the main beam from being reflected into the main beam.

It is still a further object of this invention to provide a calibration apparatus utilizing a range of low energy infrared sources having the same wavelength profile, since they are all maintained at the same ambient temperature.

Another object of this invention is to provide a calibration apparatus for radiometers which utilizes mirrors of high reflectivity in order to avoid interference.

Still another object of this invention is to provide a calibration apparatus for radiometers utilizing a calibration reference where the objective is to determine absolute radiance of an infrared target.

A further object of this invention involves the provision of a calibration apparatus utilizing emitted energy from optics which constitutes a significant portion of the overall signal.

These and other advantages, features and objects of the invention will become more apparent from the following description taken in connection with the illustrative embodiment in the accompanying drawing.

DESCRIPTION OF THE DRAWING

The drawing is a schematic representation of an arrangement of components which provide a radiometer utilizing the unique calibration technique of this invention together with a conventional telescope or collection system.

DETAILED DESCRIPTION OF THE INVENTION

Referring to the FIGURE there is shown a telescope primary mirror or reflector $M_1$ which receives infrared energy from a target. The primary mirror has a reflectivity $R_1$ and a temperature $T_1$.

The mirrors utilized in the apparatus of this invention must be pure, specular reflectors that are optically thick in a predetermined wavelength range having no diffuse component in order to avoid having energy from outside the beam being reflected into the beam by a diffuse component. The reflectivity should be high to avoid interference, and the specular dependence of the reflectivity of the mirrors should be flat in the wavelength range of interest in order to minimize the importance of the wavelength dependence of the detector response. The photon energy from the telescope primary mirror $M_1$ is reflected to a telescope secondary reflector mirror $M_2$ which has a reflectivity R and a temperature T. Although $M_1$ and $M_2$ are used to collect energy from the target, they may also be utilized to collect energy for a reference signal.

The optical train has a series of calibrating mirrors $M_c$ on a single backing plate P which is secured to and rotated by means of a Selsyn motor S which is controlled by a remotely operated triggering signal to index the separate mirrors of the series into the optical train. In a balloon borne radiometer operating at a float altitude of 105,000 feet the various calibrating mirrors applied to the backing plate P were made of gold, stainless steel, chromium and bismuth as well as a black body to calibrate in the wavelength range of from 10 to 12 microns. The mirrors alone (without the black body) were able to provide a set of calibration points covering an energy range of more than an order of magnitude. The reflectivity of these various materials are as follows:

| | |
|---|---|
| Gold | $R_{c_1} = 99\%$ |
| Stainless steel | $R_{c_2} = 94.5\%$ |
| Chromium | $R_{c_3} = 87.5\%$ |
| Bismuth | $R_{c_4} = 67\%$ |

Since the backing plate is required to maintain the same temperature for all of the mirrors mounted thereon, it must be of a material, such as copper or silver, having a high thermal conductivity in order to equalize the temperature of all of the mounted mirrors.

Energy from the calibration mirrors in the optical train is transmitted to a chopper which also collects energy from a reference beam. The chopper in turn presents the total energy to a photon detector. The detector background must remain constant since the output signal of a photon detector, such as copper-doped germanium, is determined not only by the number of signal photons reaching it, but also by the level of the background radiation viewed by the detector. This factor eliminates the utilization of an attenuating device in front of the detector, since its emission will alter the background. The field of view of the detector must also be constant between the calibration and measurement stages of the technique. When a Cassegrainian system is used for the telescope arrangement, the hole in the center of the primary mirror is required to be masked with a field of view defining aperture located between the chopper and the detector.

It should be noted that the apparatus thus far described utilizes the emitted energy from non-cooled optics. This formerly caused complications because the energy from the optics constituted a significant portion of the overall signal. These complications are amplified when the radiometer is required to provide its measurements for targets near and below ambient temperature. The problem associated with maintaining and determining the temperature either of a series of cooled black bodies or of a variable temperature, cooled, black bodies are eliminated in this invention, since the temperature of all the calibration mirrors is the same causing them to behave as gray bodies having the same wavelength dependence in their emitted energy. Thus, the calibration procedure does not involve a correction for the wavelength dependence of the detector response.

MODE OF OPERATION

The energy calibration technique of this invention is achieved by replacing a mirror in the optical train by another mirror with a different reflectivity. Because of the relationship between reflectivity $R_\lambda$ and emissivity $E_\lambda$ for opaque solid materials $E_\lambda = (1 - R_\lambda)$, the amount of energy or the number of photons introduced into the detector field of view is readily calculable from a knowledge of the reflectivity and temperature of the mirror introduced into the system. The resultant alteration of the photon flux in a predictable manner allows for the calibration.

In the FIGURE, $N_{TARGET}$ represents the number of photons per second from the target reaching the telescope primary mirror $M_1$. As was previously described, this energy is reflected to $M_2$ and then to one of the calibration mirrors $M_c$ such that the total number of photons per second $N_{TOTAL}$, which passes through the plane of the chopper in the target beam, is given by the expression $N_{TOTAL} = \{[N_{TARGET} \cdot R_1 + N_{T_1}(1 - R_1)] R_2 + N_{T_2}(1 - R_2)\} R_c + N_{T_c}(1 - R_c)$
where $N_{T_1}$, $N_{T_2}$ and $N_{T_c}$ are the number of photons per second emitted into the field of view of the detector by black bodies at temperatures $T_1$, $T_2$ and $T_c$.

Using similar considerations, an expression for $N_{REF}$, the total number of photons per second leaving the chopper in the reference beam, can be derived. The number of photons per second in this beam should be maintained constant, and preferably should be fewer than in the target beam. The detector output is then proportional to $\Delta N = N_{TOTAL} - N_{REF}$.

In order to calibrate by varying $R_c$ it is necessary that $N_{TARGET}$ be known. This is most conveniently done by pointing the radiometer at a cold target, such as space, where $N_{TARGET} \rightarrow 0$, whence $N_{TOTAL} = \{N_{T_1}(1 - R) R_2 + N_{T_2}(1 - R_2)\} R_c + N_{T_c}(1 - R_c)$.

If the mirrors $M_1$, $M_2$ and $M_c$ are at the same (ambient) temperature, i.e., $T_1 = T_2 = T_c$, then $N_{T_1} = N_{T_2} = N_{T_c}$ and the expression becomes $N_{TOTAL} = N_{T_c}(1 - R_1 R_2 R_c)$.

By selecting various values for reflectivity $R_c$ of the calibration mirrors the energy in the beam can be varied over a range of values suitable for providing the desired calibration points.

In order to measure the absolute radiance of a low energy source a calibration step must first be performed. This is one by pointing the radiometer telescope such that both the $N_{TARGET}$ and $N_{REF}$ signals would be received from a cold target such as space. The output from the detector would be plotted against the various reflectors $M_c$, which would have their indexing remotely controlled. Since the reflectivities and emissivities of the separate reflectors $M_c$ are known, a plot may be made for the energy levels of the various mirrors $M_c$ at ambient temperature. It should be noted from the formulas and the optical paths that an unbalance exists in the cancellation effect of the signals from the $N_{TARGET}$ and $N_{REF}$ because reflector $M_c$ is not in the optical train of the reference signal.

Next the telescope system is pointed at a target such that the $N_{REF}$ signal is simultaneously pointed at a cold target such as space. The energy reading from the target is made preferably with a mirror of the highest reflectivity in the series of mirrors $M_c$. This would be preferably of the same material, such as gold, and having the same reflectivity as the chopper. The output from the detector at this point is compared with the energy levels obtained in the calibration step. Since the temperature of the chopper and that of the calibrating mirrors are easily measured and are at ambient temperature an accurate determination of the absolute radiance of the target is obtained.

Thus, there has been described an apparatus made of conventional, currently available materials which provides a novel arrangement of telescope components together with a chopper or modulator and a detector which allows for a new technique for obtaining measurement of the absolute radiance of a low energy infrared target.

Although the invention has been described with reference to a particular embodiment, it will be understood to those skilled in the art that the invention is capable of a variety of alternative embodiments. For example, any indexing means may be utilized in place of the Selsyn system schematically depicted. Further, the chopper and calibrating mirror used during the measurement stage could be of different materials; however, this would introduce an error for which compensation would have to be made in order to obtain a true determination of absolute radiance.

We claim:
1. A method for determining the absolute radiance of a low energy source with a radiometer having a target optical system, a reference optical system, a modulator and a detector comprising
  directing the target and reference optical systems at a cold target, varying to predetermined values the reflectivity and emissivity of a reflector exclusively utilized in the target optical system to provide energy level outputs from the radiometer detector corresponding to the various values of emissivity at ambient temperature, directing the target optical system at an infrared target of interest while simultaneously directing the reference optical system at a cold target, comparing the output from the detector of said radiometer when said target optical system is directed at an infrared target of interest with the outputs corresponding to said various values of emissivity to determine the absolute radiance of the target of interest.

2. A radiometer comprising
an optical system having a plurality of reflectors in optical alignment for collecting energy from an infrared target of interest,
means for selectively varying the reflectivity and emissivity of one of the said reflectors,
an optical system for collecting energy from a reference target,
means for alternately passing energy from each of said optical systems, and
a detector for alternately receiving the energy from said means for passing energy to provide an output.

3. A radiometer as defined in claim 2 wherein the said one of said reflectors has among its various reflectivities and emissivities the same reflectivity and emissivity as said means for alternately passing energy, said means for passing energy serving as a reflector to direct the output from said optical system for collecting energy from a reference target to said detector.

4. A radiometer as defined in claim 2 wherein said means for alternately passing energy comprises a chopper.

5. A radiometer as defined in claim 2 wherein said means for selectively varying the reflectivity and emissivity of one of the said reflectors comprises a series of reflectors, each of which has a different reflectivity and emissivity, and indexing means for separately placing each of said reflectors of said series of reflectors into optical alignment with the plurality of reflectors of said optical system for collecting energy from a target.

6. A radiometer as defined in claim 5 wherein said reflectors of said series of reflectors are mounted on a common mounting plate having a good thermal conductivity.

7. A radiometer as defined in claim 5 wherein one of the reflectors of said series of reflectors is gold.

8. A radiometer as defined in claim 5 wherein one of the reflectors of said series of reflectors is stainless steel.

9. A radiometer as defined in claim 5 wherein one of the reflectors of said series of reflectors is chromium.

10. A radiometer as defined in claim 5 wherein one of the reflectors of said series of reflectors is bismuth.

* * * * *

UNITED STATES PATENT OFFICE
CERTIFICATE OF CORRECTION

Patent No. 3,765,779　　　　　　　　　　Dated Oct. 16, 1973

Inventor(s) Graham R. Hunt and Lloyd M. Logan

It is certified that error appears in the above-identified patent and that said Letters Patent are hereby corrected as shown below:

Column 1, lines 20-23, cancel the entire lines;

line 68, after "interference" add -- from changing backgrounds --.

Column 2, lines 31 and 32, cancel "The reflectivity should be high to avoid interference, and the" and substitute therefor -- The --;

line 38, change "R" to -- $R_2$ --;

line 39, change "T" to -- $T_2$ --.

Column 3, line 29, cancel "bodies are" and substitute therefor -- body is --.

Column 4, line 7, cancel "$="T_c$" and substitute therefor -- $=T_c$ --;

line 16, cancel "one" and substitute therefor -- done --.

Signed and sealed this 14th day of May 1974.

(SEAL)
Attest:

EDWARD M. FLETCHER, JR.　　　　　　C. MARSHALL DANN
Attesting Officer　　　　　　　　　　Commissioner of Patents